United States Patent Office 3,523,943
Patented Aug. 11, 1970

3,523,943
16,17-ACETAL DERIVATIVES OF THE RETRO PREGNANE SERIES
Engbert Harmen Reerink, Pieter Westerhof, and Hendrik Frederik Louis Scholer, Van Houtenlaan, Weesp, Netherlands, assignors, by mesne assignments, to U.S. Philips Corporation, a corporation of Delaware
No Drawing. Continuation of application Ser. No. 681,939, Nov. 9, 1967, which is a continuation of application Ser. No. 472,702, July 16, 1965. This application Apr. 14, 1969, Ser. No. 824,341
Int. Cl. C07c *173/00, 169/66;* A61k *17/06*
U.S. Cl. 260—239.55         14 Claims

ABSTRACT OF THE DISCLOSURE $16\alpha,17\alpha$-dioxy derivatives of $9\beta,10\alpha$ steroids of the pregnane series. Examples are 6-fluora-$16\alpha$, $17\alpha$-isopropylidenedioxy-$9\beta$, $10\alpha$-pregna - 4,6 - diene - 3,20 - dione; 6-methyl, $16\alpha,17\alpha$-isopropylidenedioxy-$9\beta$, $10\alpha$-pregna-4,6-diene - 3,20 - dione and $16\alpha,17\alpha$-isopropylidenedioxy-$9\beta$, $10\alpha$-pregn-4-ene-3,20-dione. The compounds are generally progestationally active. This abstract is not intended to be a description of the invention defined by the claims.

---

This application is a continuation of application Ser. No. 681,939, filed Nov. 9, 1967, and now abandoned, said application Ser. No. 681,939 being a continuation of application Ser. No. 472,702, filed July 16, 1965, and now abandoned and said application Ser. No. 472,702 being a continuation-in-part of application Ser. No. 201,824, filed June 12, 1962, and now U.S. Pat. 3,198,782.

The invention relates to new $9\beta,10\alpha$-steroids having the general formula:

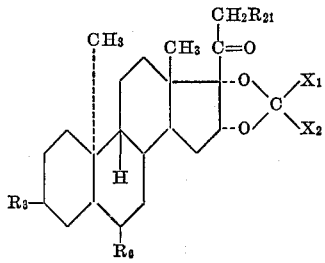

in which formula:

$R_3$ is a 3-keto-4-dehydro-, 3-keto-4,6-bisdehydro-, 3-keto-1,4-bisdehydro-, 3-alkoxy-3,5-bisdehydro- or 3-acyloxy-3,5-bisdehydro-group,
$R_6$ is a hydrogen atom, fluorine atom, chlorine atom, bromine atom or a methyl group,
$R_{21}$ is a hydrogen atom or a hydroxy or acyloxy group,
$X_1$ is a hydrogen atom or an alkyl, aryl, aralkyl or heterocyclyl group,
$X_2$ is a hydrogen atom or an alkyl, aryl, aralkyl or heterocyclyl group, with the exception of the combination $R_3$ is an acyloxy-3,5-bisdehydro-group and $R_6$ is fluorine, chlorine or bromine.

If $R_3$ represents a 3-alkoxy-3,5-bisdehydro group the alkoxy group preferably is an aliphatic or mixed aliphatic-aromatic or an alicyclic alkoxy group containing from 1 to 10 carbon atoms, for example, a methoxy, ethoxy, propoxy, tert. butoxy, cyclopentyloxy, cyclohexyloxy or benzyloxy group.

If $R_3$ is an acyloxy group, then this group preferably is the acyloxy group of an aliphatic monocarboxylic acid containing from 1 to 6 carbon atoms, for example, formic acid, acetic acid, propionic acid or butyric acid.

If $R_{21}$ represents an acyloxy group, this group preferably is the acyloxy group of an aliphatic mono-, di- or tricarboxylic acid containing from 1 to 20 carbon atoms, or the acyloxy group of a mixed aliphatic-aromatic carboxylic acid. Examples of such acyloxy groups are: formoxy, acetoxy, propionoxy, butyroxy and the acyloxy groups of malonic acid, succinic acid, citric acid, stearic acid, palmitic acid.

It should be remarked that the stereochemical configuration of the steroid skeleton of the compounds according to the invention at the carbon atoms 8, 9, 10, 13 and 14 is the same as that in dihydroisolumisterone. Castells et al. (Proc. Chem. Soc. 1958, page 7) have shown that the latter compound has the configuration $8\beta,9\beta,10\alpha,13\beta,14\alpha$. The compounds according to the invention are designated as "$9\beta,10\alpha$-steroids" to indicate at which carbon atoms (9 and 10) the stereoconfiguration differs from that of the normal steroids and in which sense ($9\beta,10\alpha$- in contrast with the $9\alpha,10\beta$-configuration of the normal steroids).

The compounds according to the invention have a particular pharmacological activity. More particularly they have a hormonal activity. Generally the compounds are progestational. Especially $16\alpha,17\alpha$-isopropylidenedioxy-$9\beta,10\alpha$-pregn-4-ene-3,20-dione is orally and parenteral progestational, not androgenic, not estrogenic, inducing deciduomata, maintaining pregnancy, especially when an estrogenicaly active compound is administered simultaneously, and inhibiting ovultion. The compound $16\alpha,17\alpha$-isopropylidenedioxy-$9\beta,10\alpha$-pregna-4-diene - 3,20 - dione qualitatively has the same properties as the preceding compound. Furthermore, both $9\beta,10\alpha$-pregna-4,6-diene-3,20-dione-$[16\alpha,17\alpha$-d$]$-$2'\alpha$-phenyl - $2'\beta$ - methyl - $1',3'$-dioxolane and $16\alpha,17\alpha$-($1'\alpha$-($2''$-furyl)-ethylenedioxy)-$9\beta,10\alpha$-pregna-4,6-diene-3,20-dione are orally and parenterally progestational.

Examples of the compounds according to the invention are:

$16\alpha,17\alpha$-isopropylidenedioxy-$9\beta,10\alpha$-pregn-4-ene-3,20-dione
$16\alpha,17\alpha$-isopropylidenedioxy-$9\beta,10\alpha$-pregna-4,6-diene-3,20-dione
$9\beta,10\alpha$-pregna-4,6-diene-3,20-dione-$[16\alpha,17\alpha$-d$]$-$2'\alpha$-phenyl-$2'\beta$-methyl-$1',3'$-dioxolane
$16\alpha,17\alpha$-($1'\alpha$-($2''$-furyl)-ethylenedioxy-$9\beta,10\alpha$-pregna-4,6-diene-3,20-dione
$6\alpha$-methyl-$16\alpha,17\alpha$-isopropylidenedioxy-$9\beta,10\alpha$-pregn-4-ene-3,20-dione
$6\beta$-methyl-$16\alpha,17\alpha$-isopropylidenedioxy-$9\beta,10\alpha$-pregn-4-ene-3,20-dione
3-acetoxy-$16\alpha,17\alpha$-isopropylidenedioxy-$9\beta,10\alpha$-pregna-3,5-diene-20-one
6-chloro-$16\alpha,17\alpha$-isopropylidenedioxy-$9\beta,10\alpha$-pregna-1,4,6-triene-3,20-dione
6-fluoro-$16\alpha,17\alpha$-isopropylidenedioxy-$9\beta,10\alpha$-pregna-4,6-diene-3,20-dione
$16\alpha,17\alpha$-isopropylidenedioxy-$9\beta,10\alpha$-pregna-1,4,6-triene-3,20-dione
6-chloro-$16\alpha,17\alpha$-isopropylidenedioxy-$9\beta,10\alpha$-pregna-4,6-diene-3,20-dione
21-acetoxy-$16\alpha,17\alpha$-isopropylidenedioxy-$9\beta,10\alpha$-pregna-4,6-diene-3,20-dione
21-acetoxy-$16\alpha,17\alpha$-isopropylidenedioxy-$9\beta,10\alpha$-pregn-4-ene-3,20-dione
$6\beta$-fluoro-$16\alpha,17\alpha$-isopropylidenedioxy-$9\beta,10\alpha$-pregna-1,4-diene-3,20-dione
6-methyl-$16\alpha,17\alpha$-isopropylidenedioxy-$9\beta,10\alpha$-pregna-4,6-diene-3,20-dione
$16\alpha,17\alpha$-isopropylidenedioxy-$9\beta,10\alpha$-pregna-1,4-diene-3,20-dione
$6\beta$-chloro-$16\alpha,17\alpha$-isopropylidenedioxy-$9\beta,10\alpha$-pregna-1,4-diene-3,20-dione 6(α and β)-fluoro-16α,17α-isopropylidenedioxy-9β,10α-pregn-4-ene-3,20-dione.

The compounds according to the invention can be produced by methods adapted to be used for producing analogous compounds. In particular, for introducing the double bonds at the positions 1,2 and 6,7, for introducing a 3,5-bisdehydro-3-enolether-or-ester group, for introducing the 21-hydroxy, 21-acyloxy, the 16,17-ketal groups and for introducing a 6-halo or a 6-methyl-group into a 9β,10α-steroid, methods can be used which are also suitable for introducing these groups or substituents at the corresponding positions in normal steroids.

In particular the compounds according to the invention may be produced in that (a) A compound of the formula:

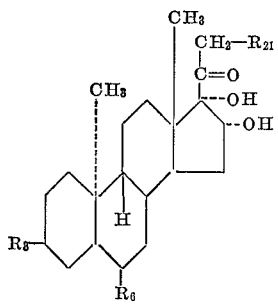

in which formula $R_3$, $R_6$ and $R_{21}$ have the meanings given to them in claim 1, with the understanding that $R_3$ cannot be a 3-acyloxy- or 3-alkoxy-3,5-bisdehydro group, is treated with a ketone or aldehyde of the formula

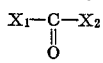

in which formula $X_1$ and $X_2$ are a hydrogen atom, an alkyl, aryl, aralkyl or a heterocyclyl group and may be equal or different groups;

(b) A compound of the general formula:

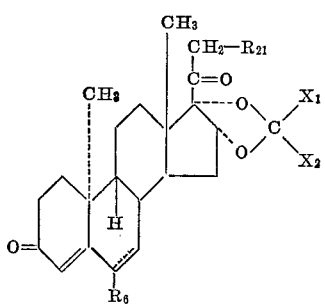

in which formula $R_6$, $R_{21}$, $X_1$ and $X_2$ have the above-mentioned meanings, whilst a double bond may be present between the carbon atoms 6,7, is treated with $SeO_2$, 2,3-dichloro-5,6-dicyano-benzoquinone in order to introduce a double bond between the carbon atoms 1 and 2;

(c) A compound of the general formula:

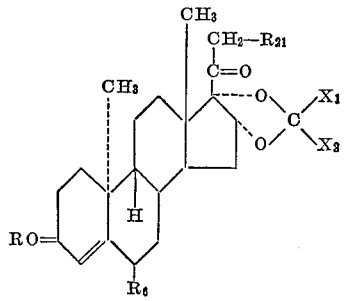

in which formula $R_6$, $R_{21}$, $X_1$ and $X_2$, have the above-mentioned meanings, is treated with a benzoquinone, in which 2 or more of the hydrogen atoms are substituted by chlorine or by chlorine and a cyano group, for example, 2,3-dichloro-5,6-dicyano-benzoquinone, or 2,3-5,6-tetrachloro-benzoquinone (chloranil) for the introduction of a double bond between the carbon atoms 6 and 7;

(d) A compound of the general formula:

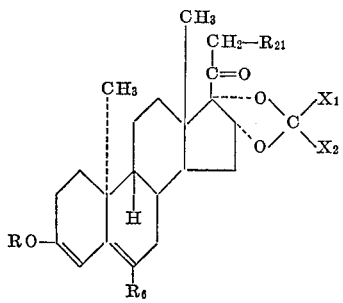

in which formula OR is an alkoxy or an acyloxy group and $R_6$, $R_{21}$, $X_1$ and $X_2$ have the above-mentioned meanings, is treated with an oxidizing agent, such as manganese dioxide, 2,3 - dichloro-5,6-dicyanobenzoquinone (D.D.Q.) tertiary butyl-chromate, so that the corresponding 3-keto-4,6-bisdehydro compound is produced;

(e) A compound of the general formula:

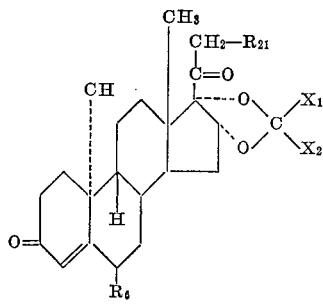

in which compounds $R_6$, $R_{21}$, $X_1$ and $X_2$ have the above-mentioned meanings, is converted into a 3-alkoxy-3,5-bisdehydro compound by reaction with an orthoformic acid alkyl ester in the presence of a catalyst, such as paratoluene-sulphonic acid or hydrochloric acid, (f) A compound of the general formula:

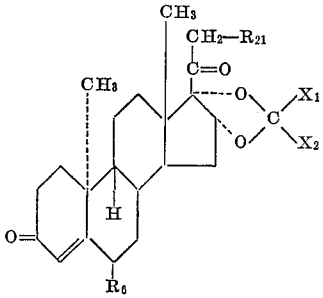

in which formula $R_6$, $R_{21}$, $X_1$ and $X_2$ have the above-mentioned meanings, is treated with a dialkoxypropane in the presence of a catalyst, for example p-toluenesulphonic acid, to produce the corresponding 3-alkoxy-3,5-bisdehydro compound;

(g) A compound of the general formula:

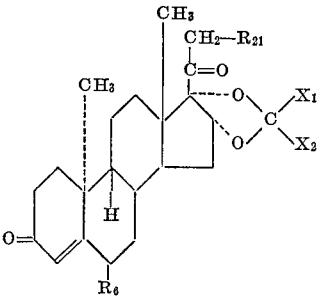

in which formula $R_6$ is a hydrogen atom or a methyl group and $R_{21}$, $X_1$ and $X_2$ have the meanings given in claim 1, is treated with an esterifying agent, such as acyl anhydride or isopropanyl acylate, in the presence of a catalyst, such as p-toluene sulphonic acid, to produce the corresponding 3-acyloxy-3,5-bisdehydro compound;

(h) A compound of the general formula:

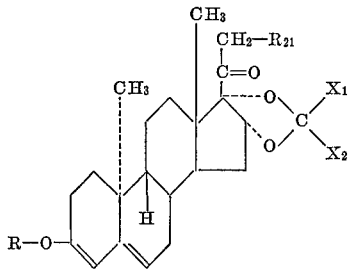

in which formula R—O represents an alkoxy or an acyloxy group and $R_{21}$, $X_1$ and $X_2$ have the above-mentioned meanings, is halogenated with perchloryl fluoride or with an N-haloimide, such as as N-bromo- or N-chloro-succinimide, or with chlorine or bromine, to produce the corresponding 3-keto-4-dehydro-6-fluoro (or 6-chloro- or 6-bromo) compound, (j) A compound of the general formula:

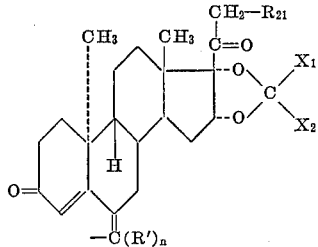

in which formula R' is a hydrogen, chlorine or bromine atom n is 2 and $R_{21}$, $X_1$ and $X_2$ have the above-mentioned meanings, is hydrogenated with hydrogen in the presence of a noble metal catalyst on a support, in which reaction the 6-di-R'-methylene group is converted into a 6-methyl group;

(k) A compound of the general formula:

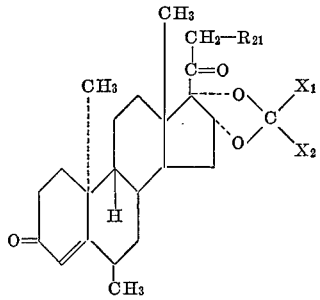

in which formula $R_{21}$, $X_1$ and $X_2$ have the above-mentioned means, is isomerized with an acid, such as hydrochloric acid, in an organic solvent, such as acetic acid or dioxan, to produce the corresponding 6β-methyl compound;

(l) A compound of the general formula:

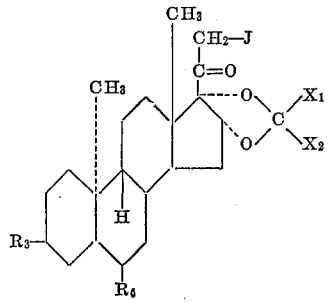

in which formula:
$R_3$ is a 3-keto-4-dehydro-, 3-keto-4,6-bisdehydro- or 3-keto-1,4,6-trisdehydro-group,
$R_6$ is a hydrogen atom or a methyl group and
$X_1$ and $X_2$ have the above-mentioned means, is subjected to acylolysis by treatment with an alkali acylate, as the case may be, with subsequent saponification of the 21-acyloxy group formed.

The reactions may be carried out in a manner familiar to the normal expert in this field of chemistry. In general, the reactions are carried out in the presence of solvents at temperatures between —20° C. and about 100° C., while it is preferable for many reactions to take place in an atmosphere of an inert gas, for example, nitrogen.

Many of the afore-mentioned groups of starting materials have not been described in the literature before. Brief directions for preparing these compounds are given below (the paragraph reference characters (a) to (l) correspond to those above).

(a) 16α,17α-dihydroxy-9β, 10α-steroids may be prepared by microbiologically hydroxylating a 20-keto-9β,-10α-steroid having an α-hydrogen atom at the position 17 and two hydrogen atoms at the carbon atom 16, for example, with the aid of *Sepedonium ampullosoporum* Damon, *Sepedonium chrysospermum* (Bull., Fr. Boudyn) or *Stagonospora curtesii* (Berk et Cke.) Sacc, after which an α-hydroxyl group is introduced at the carbon atom 16, by subsequently splitting off water from the compound produced, for example, with the aid of dilute sodium hydroxide or of sulphuric acid with the resultant formation of a 20-keto-16-dehydro-9β,10α-steroid, and by treating such a compound with osmium tetraoxide with subsequent decomposition of the intermediate osmate with hydrogen sulphide, or by hydroxylating such a 16-dehydro compound with potassium permanganate under conditions which are neutral or mildly acid due to the presence of formic acid.

If the desired final product contains a 1- and 6-dehydro double bond, a 6-halogen atom or a 21-acyloxy or 21-hydroxy group, the 16,17-ketalising reaction and the preceding introduction of a 16- and 17-hydroxyl group preferably are performed before the introduction of the said double bonds and/or substituents. In general, the 16,17-ketals according to the invention are comparatively stable compounds, and this stability may be utilized to advantage when further substituents have to be introduced in these compounds.

The ketalizing reaction itself is preferably performed in the presence of a catalyst, such as hydrochloric acid, boron trifluoride or perchloric acid. As an aldehyde or ketone

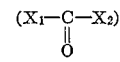

use is preferably made of a compound in which both $X_1$ and $X_2$ are either alkyl groups containing from 1 to 6 carbon atoms or hydrogen atoms, or in which one is a hydrogen atom and the other an alkyl group containing from 1 to 6 carbon atoms, for example, formaldehyde, acetaldehyde or acetone. Good results are also achieved with acetophenone and with acetofuran.

(e) The enol-etherification proceeds particularly successfully with orthoformic acid alkyl ester, the alkyl part of which is an aliphatic group containing from 1 to 6 carbon atoms, for example, methyl or ethyl.

(g) The reaction is preferably carried out with isopropenyl acetate or with acetic acid anhydride. It should be noted that enol-esterification of a 6-halogen-9β,10α-steroid by means of the method used did not produce the desired result.

(j) The starting materials for this reaction are divided into two different groups, i.e., the 6-dihalo-methylene compounds and the 6-methylene compounds, each group requiring a special method of production.

The production of the 6-dihalo-methylene compounds may start from a 3-ethoxy-3,5-bisdehydro-9β,10α-steroid, which in the presence of an organic base, for example, collidine or pyridine, is reacted with a tetrahalomethane, for example, tetrabromomethane or trichloromonobromomethane, if required in the presence of a peroxide, such as benzol peroxide, or with irradiation with ultraviolet light. During this reaction a 3-keto-4-dehydro-6-dihalomethyl compound is formed. This compound is dehydrohalogenated in the usual manner with a base in an aliphatic alcohol to produce the desired starting material (6-dihalo-methylene).

The 6-methylene compounds may be prepared by the "Vilsmeier"-reaction. For this purpose, for example, 3-ethoxy-3,5-bisdehydro-9β,10α-steroid is reacted with dimethylformamide and phosgene. By hydrolysis of the intermediate iminium compound the corresponding 3-ethoxy-3,5-bisdehydro-6-formyl-9β,10α-steroid is produced. This compound can be converted into the corresponding 6-hydroxy-methyl-3-ethoxy-3,5-bisdehydro compound by catalytic reduction or by reduction with sodium- or lithiumborohydride. Subsequent treatment of the latter compound with aqueous dilute acids gives rise to hydrolysis of the enolether group with simultaneous dehydration of the 6-hydroxy-methyl group with the formation of a 3-keto-4-dehydro-6-methylene-9β,10α-steroid. The latter part of the reaction is preferably performed in dilute aqueous acetic acid or in dilute methanolic or ethanolic hydrogen chloride or sulphuric acid.

The hydrogenation of the 6-dihalomethylene group can suitably be carried out with a catalyst consisting of palladium deposited on strontium carbonate, in the presence of an organic base, such as tertiary amine, for example, triethylamine. The hydrogenation as a rule leads to the formation of a product consisting in excess of the 6α-methyl compound. This compound may be converted into the 6β-methyl compound by acid isomerisation.

(1) The production of 21-iodo-20-keto-9β,10α-steroids may be effected as follows:

A 9β,10α-steroid having an acetyl group in β-position at the carbon atom 17 is subjected to a condensation reaction with an oxalic acid dialkyl ester, for example, the dimethyl or diethyl ester, in the presence of a base, such as sodium hydride or sodium methylate. Treatment of the resulting condensation product with iodine gives the desired 21-iodo-20-keto-9β,10α-steroid to be used as the starting material for the acylolysis reaction.

The compounds according to the invention may be worked up into pharmaceutical or veterinary preparations in a conventional manner. Injection liquids are prepared by dissolving a compound according to the invention in methylene chloride, dissolving the resulting solution in arachid oil and subsequently removing the methylene chloride by evaporation. Suppositories may be prepared by intimately mixing an active compound with an ester of a higher aliphatic alcohol and a higher aliphatic carboxylic acid, for example carbowaxes or cacao butter, or with a mixture of gelatine and glycerol. The compounds according to the invention may further be worked up into tablets with the usual fillers, such as starch, or binding agents or lubricants, for example, magnesium stearate, carboxy-methyl cellulose and the like.

EXAMPLES (1) Production of 9β,10α-pregna-4,16-diene-3,20-dione from 16α-hydroxy-9β,10α-pregn-4-ene-3,20-dione 5 gms. of 16α-hydroxy-9β,10α-pregn-4-ene-3,20-dione were dissolved in 500 mls. of benzene. After the addition of 100 mgms. of p-toluenesulphonic acid the solution was refluxed for 1 hour. The solvent was then distilled off in vacuuo and the residue was absorbed in methylene chloride. After washing with sodium bicarbonate and water and drying, the substance was evaporated to dryness and the residue (4.9 gms.) subjected to chromatography on silica gel. 3.8 gms. of a pure fraction were obtained which, after crystallisation from methanol, had a melting point from 165° C. to 167° C. The infrared absorption spectrum included the following bands: 1663, 1616, 1579, 1368, 1233, 947, 862 and 824 cm.$^{-1}$; $\epsilon$ ($\lambda$ max. 240)= 25,300.

(2) Production of 16α,17α-dihydroxy-9β,10α-pregn-4-ene-3,20-dione from 9β,10α-pregna-4,16-diene-3,20-dione Solution A.—10 gms. of 9β,10α-pregna-4,16-diene-3,20-dione were dissolved in 250 mls. of acetone, and 23 mils. of formic acid (10%) are added to this solution.

Solution B.—6.3 gms. of potassium permanganate were dissolved in 90 mls. of water, 160 mls. of acetone being then added to the solution. The solution A was poured into a calibrated separating funnel and the solution B was poured into a second calibrated separating funnel. The two separating funnels were connected by small lengths of rubber hose to 2 glass coils which were both connected to the same Y-piece. The third tube of the Y-piece was also connected to a glass coil. The assembly of glass coils and Y-piece was arranged in a vessel so that the reaction system could be cooled in carbon dioxide-acetone. The two solutions A and B were caused to flow together at a rate such that the overall contact time was about 10 seconds. The reaction temperature was adjusted to about −5° C. The reaction mixture was poured into a stirred sodium bisulfite solution (40 mls., 10%) to which a small amount of manganese sulphate had been added. After the manganese dioxide formed had been removed by filtering and thoroughly washed with acetone, the acetone was distilled off from the filtrate in vacuo. The resulting crystallisate was drawn off, washed with water and dried. Yield: 80% of substantially pure 16α,17α-dihydroxy-9β,10α-pregn-4-ene-3,20-dione. An analytically pure preparation exhibited the following physical constants: melting point 209–212° C.; $\epsilon$ 241.5 mm.=16,600; $[\alpha]_D^{25}$= −138°; I.R. 860, 1231, 1348, 1415, 1615, 1661 and 1693 cm.$^{-1}$.

(3) Production of 16α,17α-isopropylidenedioxy-9β,10α-pregn-4-ene-3,20-dione from 16α,17α-dihydroxy-9β,10α-pregn-4-ene-3,20-dione 13.85 gms. of 16α,17α - dihydroxy - 9β,10α-pregn-4-ene-3,20-dione were suspended in 400 mls. of acetone. 4 mls. of perchloric acid (70%) were added dropwise under a nitrogen atmosphere at room temperature. Owing to the conversion to the 16,17-ketal the reaction mixture became clear after a few minutes. The mixture was stirred for 45 minutes and the solution was poured into 2 ls. of water. After extraction with ether and washing of the extract the solvent was removed. Crystallisation from ether produced 16α,17α - isopropylidene-dioxy - 9β,10α-pregn-4-ene-3,20-dione in a yield of 89%, melting point 150–151° C.; $\epsilon$ 241 mms.=16,600; I.R. 859, 1038, 1211, 1343, 1374, 1382, 1421, 1608, 1666 and 1712 cm.$^{-1}$.

(4) 5 gms. of 16α,17α - isopropylidenedioxy-9β,10α-pregn-4-ene-3,20-dione were dissolved in chloroform and the solution was homogeneously mixed with the 185 gms. of lactose. The mixture was dried at 40° C. for 1 hour. It was then wetted with a 10% aqueous solution of 1.5 gms. of gelatine and subsequently ground through a 20-mesh sieve. The mixture was dried at 45° C. for 24 hours and again ground through a 20-mesh sieve. The grains were weighed. Proportional amounts of potato starch, Talcum venetum and magnesium stearate were then added in quantities of optimally 33.5, 8, and 2 gms. respectively. The resulting mixture was homogenized and worked up into tablets of 235 mgms. each.

(5) 0.2 mole of 16α-hydroxy-9β,10α-pregna-4,6-diene-3,20-dione was boiled for 3 hours under azeotropic distillation in benzene, to which 6 gms. of p-toluenesulphonic acid had been added. The resulting 9β,10α-pregna-4,6,16-triene-3,20-dione, after recrystallisation from a mixture of equal parts of methylene chloride and diethylether, had a melting point of 132.5–133° C. $[\alpha]_D^{25}=-430\pm5$ (dioxan); $\epsilon$ ($\lambda$ max. 237.5)=12,000; $\epsilon$ ($\lambda$ max. 284)= 27,400.

18.15 gms. of this compound were dissolved in 300 mls. of benzene, after which 37.5 gms. of pyridine and 15 gms. of osmium tetraoxide in 500 mls. of benzene were added. The mixture was stirred in the dark at room temperature for three days. Ethyl acetate was added to the reaction product and the mixture was then treated with gaseous hydrogen sulphide, the reaction product of the steroid with osmium tetraoxide being decomposed. The resulting osmium sulphide was filtered off and the remaining mixture of 9β,10α-steroids was subjected to chromatography on silica gel. From the benzene ethyl acetate (1:1) fraction 16α,17α - dihydroxy - 9β,10α-pregna-4,6-diene-3,20-dione was isolated. Melting point 210–215° C. (after recrystallisation from methylene chloride and diisopropyl ether). $[\alpha]_D^{25}=-528\pm5$; $\epsilon$ ($\lambda$ max. 285)=27,100.

The resulting compound was converted, with acetone and 70% perchloric acid as a catalyst, into 16α, 17α-isopropylidene - dioxy - 9β,10α - pregna-4,6-diene-3,20-dione. The substance, when crystallized from a mixture of methylene chloride and diisopropyl-ether, had a melting point of 182–183° C.; $[\alpha]_D^{25}=-452\pm5$ (dioxan); $\epsilon$($\lambda$ max. 284)=27,100.

(6) 16α,17α - isopropylidenedioxy - 9β,10α - pregn - 4-ene-3,20-dione was converted in benzene, with isopropenyl acetate and p-toluenesulphonic acid as a catalyst, into 3 - acetoxy - 16α,17α - isopropylidenedioxy-9β,10α-pregna-3,5-diene-20-one. The compound was recrystallized from methanol to which a trace of pyridine had been added. Melting point 108–112° C.; $\epsilon$($\lambda$ max. 234)=18,200.

(7) 9β,10α-pregna-4,6-diene-3,20-diono[16α,17α-d]-2'β-methyl-2'α-phenyl-1',3'-dioxolane In an atmosphere of nitrogen 689 mg. (2 mmoles) of 16α,17α - dihydroxy - 9β,10α-pregna-4,6-diene -3,20-dione were suspended in 50 ml. of freshly distilled acetophenone. To the magnetically stirred suspension was added 0.3 ml. of 70% perchloric acid.

The steroid went into solution within 15 minutes and was allowed to stand at room temperature overnight. The reaction mixture was filtered through silica gel (400-fold in respect to the steroid). Most of the acetophenone was eluted with petroleumether and benzene, while the steroid, along with some acetophenone, was eluted with ethylacetate. The residual acetophenone was removed in high vacuo and the 9β,10α-pregna-4,6-diene-3,20-diono-[16α, 17α - d] - 2'β - methyl-2'α-phenyl-1',3'-dioxolane was obtained in pure form by recrystallization from benzene/ligroin and finally from diisopropylether, melting point 190–191°; $[\alpha]_D^{25}=507°\pm5°$ (dioxan);

UV: $\lambda_{max.}^{EtOH}=284.5$ m$\mu$/$\epsilon$=25,600

IR- and NMR-spectra are consistent with the structure.

(8) 9β,10α-pregna-4,6-diene-3,20-diono-[16α,17α-d]-2'α-methyl-2'β-(2''-furyl)-1',3'-dioxolane (II) and 9β,10α-pregna-4,6-diene-3,20-diono-[16α,17α-d]-2'β-methyl-2'α-(2''-furyl)-1',3'-dioxolane (III)

(A) A suspension of 1.034 g. (3 mmoles) of 16α,17α-dihydroxy-9β,10α-pregna-4,6-diene-3,20-dione in 10 g. of freshly distilled 2-furylmethylketone, 6 ml. of chloroform and 0.5 ml. of 70% perchloric acid was stirred in an atmosphere of nitrogen. After 35 minutes all steroid was in solution. After 2 hours 2 ml. of a saturated solution of potassium carbonate was added and the mixture was reduced to a slurry in high vacuo (bath temperature 35–40°). The residue was taken up in ether/methylenechloride 4:1 and consecutively washed with water (once), a solution of 2% sodiumbicarbonate (twice) and water (twice). The organic phase was dried over sodiumsulfate and evaporated to dryness in vacuo. The residue was dissolved in benzene and added to a column of silica gel (10-fold). With benzene and isooctane/ethylacetate 5:1 some residual 2-furylmethylketone was eluted. Isoocetane/ethylacetate 3:1 eluted a mixture of the ketals II and III (ratio II:III ca. 4:1 as judged by NMR), melting point 183–186°. The 9β,10α - pregna - 4,6 - diene-3,20-diono-[16α, 17α-d]-2'α-methyl-2'β-(2''-furyl)-1',3'-dioxolane (II) was obtained pure by crystallization from methylenechloride/ether, melting point 245–247°; $[\alpha]_D^{25}=-426°\pm5°$ (dioxane);

UV: $\lambda_{max.}^{EtOH}=284$ m$\mu$/$\epsilon$=28,200

IR- and NMR-spectra are consistent with the structure.

(B) A suspension of 1.034 g. (3 mmoles) of 16α,17α-dihydroxy-9β,10α-pregna-4,6-diene-3,20-dione (I) in 5 ml. of benzene, 11.0 g. 2-furylmethylketone and 0.05 ml. of 70% perchloric acid was stirred in an atmosphere of nitrogen. After 45 minutes all steroid was in solution. The reaction mixture was allowed to stand for 2 hours at room temperature. Ether/methylenechloride 4:1 (500 ml.) was added. The organic phase was extracted with a solution of 2% sodiumbicarbonate (thrice) and water (thrice), dried over sodium-sulfate and evaporated under reduced pressure. The excess of 2-furylmethylketone was removed in high vacuo. The steroid was dissolved in benzene and chromatographed on silicagel (10-fold). The ketal III, the main product, was eluted with isooctane/ethyl-acetate 5:1, 4:1 and 3:1, a small amount of a mixture of the ketals II and III was obtained with isooctane/ethylacetate 3:1 and 1:1 while some unreacted diol I was eluted with ethylacetate. The ketal III was recrystallized from methylenechloride/diisopropylether and pure 9β,10α-pregna-4,6-diene - 3,20 - diono-[16α,17α-d]-2'-β-methyl-2'α-(2''-furyl)-1',3'-dioxolane (III) was obtained, melting point 197–198°; $[\alpha]_D^{25}=-474°\pm5°$ (dioxane);

UV: $\lambda_{max.}^{EtOH}=284$ m$\mu$/$\epsilon$=26,200

IR- and NMR-spectra are consistent with the structure.

(9) 16α, 17α-isopropylidenedioxy-9β, 10α-pregna-1,4-diene-3,20-dione (A) A solution of 386 mg. (1 mmole) of 16α,17α-isopropylidene - dioxy - 9β,10α - pregn - 4 - ene-3,20-dione in 5 ml. of purified dry dioxane, containing 1% o. of hydrochloric acid, was treated in an atmosphere of nitrogen dropwise with a solution of 295 mg. (1.3 mmoles) of 2,3-dichloro-5,6-dicyano-benzoquinone in 10 ml. of dioxane, containing 1% o. of hydrochloric acid. The reaction mixture was stirred at room temperature for 24 hours, treated with an excess of sodiumbicarbonate and a trace of water and refluxed for a period of 3 minutes. The mixture was filtered and the filtrate was evaporated to dryness in vacuo. The residue was taken up in benzene and chromatographed on silicagel (60-fold). Some starting material was eluted with petroleumether/ether 2:1 and the dehydrogenation product with petroleumether/ether 2:1 and 1:1. The 16α,17α-isopropylidenedioxy-9β,10α-pregna-1,4-diene-3,20-dione was recrystallized from methylenechloride/diisopropylether melting point 172–174°; $[\alpha]_D^{25}=-28°\pm5°$ (dioxane), UV: $\lambda_{max.}^{EtOH}=241$ m$\mu$/$\epsilon$=14,600

IR-, NMR- and mass-spectra are consistent with the structure.

(B) A suspension of 386 mg. (1 mmole) of 16α,17α-isopropylidene - dioxy - 9β,10α - pregn - 4 - ene - 3,20-one 295 mg. (1.3 mmoles) of 2,3-dichloro-5,6-dicyano-benzoquinone in 10 ml. of purified dioxane was refluxed for 6 hours. Within 20 minutes all material was in solution. After cooling, sodiumbicarbonate and a trace of water was added and the mixture refluxed for 3 minutes. The mixture was filtered, the filtrate was evaporated to dryness in vacuo, dissolved in benzene and chromatographed on silicagel as described above. The pure 16α, 17α-isopropylidenedioxy-9β,10α-pregna-1,4-diene,-3,20-dione was obtained pure after recrystallization from methylenechloride/diisopropylether, melting point 173–174°; identical in all respects with the material obtained above (A).

(10) 16α, 17α-isopropylidenedioxy-9β,
10α-pregna-1,4,6-triene-3,20-dione (II)

A solution of 384 mg. (1 mmole) of 16α-17α-isopropylidenedioxy-9β,10α-pregna-4,6-diene-3,20-dione (I) and 295 mg. (1.3 mmoles) of 2,3-dichloro-5,6-dicyanobenzoquinone in 10 ml. of purified dioxane, containing 2% o. of hydrochloric acid was stirred at room temperature for 1½ hours. An excess of sodium carbonate and a trace of water was added. The mixture was refluxed for 3 minutes, filtered and the filtrate was evaporated to dryness in vacuo. The residue was dissolved in benzene and chromatographed on silica gel (40-fold). The 16α, 17α-isopropylidenedioxy-9β, 10α-pregna-1,4,6-triene-3,20-dione (II) was eluted with petroleumether/ether 1:1 and recrystallized from methylenechloride/diisopropylether, melting point 203°; $[\alpha]_D^{25} = -327° \pm 5°$ (dioxane), UV: $\lambda_{max.}^{EtOH}$ ($\epsilon$): 221.5 m$\mu$ (12,600), 252 m$\mu$ (9,660), 300.5 m$\mu$ (13,080)

IR-, NMR- and mass-spectra are consistent with the structure.

EXAMPLE 11

2 g. of 16α,17α-isopropylidene-dioxy-9β,10α-pregn-4-ene,3,20-dione were dissolved in chloroform, which solution was mixed homogeneously with 194 g. of lactose. The mixture was dried at 40° C. during 1 hour. The mixture was wetted with a 10% aqueous solution of 2 g. of gelatine and subsequently ground through a 20 mesh sieve. The mixture was dried at 40° C. during 24 hours, whereupon the granules were ground through a 20 mesh sieve. The mixture was weighed and then had added to it proportional amounts of *Talcum venetum* and magnesium stearate in amounts of optimally 25 mg. and 2 mg. respectively. The resulting mixture was homogenised and worked to tablets of 225 mg. each.

EXAMPLE 12

Injection liquids of 16α,17α-isopropylidene-dioxy-9β, 10α-pregna-4,6-diene-3,20-dione (active ingredient) were made as follows.

5.00 g. of the active ingredient were dissolved in 90 mls. of a solution of 2% w./v. benzylalcohol and 46% w./v. benzylbenzoate in ricinic oil at a temperature of 60° C. The solution was cooled to room temperature and replenished to 100 mls. with the ricinic oil solution aforesaid. The mixture was homogenised by stirring and filtrated. Ampoules and vials were filled with the filtrated solution, subsequently sealed and then sterilised by heating for one hour at 120°.

What we claim is:
1. Compounds of the formula

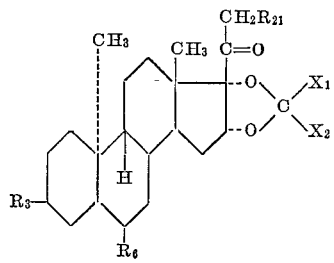

wherein $R_3$ is a moiety selected from the group consisting of 3-keto-4-dehydro, 3-keto-4,6-bisdehydro, 3-keto-1,4,6-trisdehydro, 3-alkoxy-3,5-bisdehydro, and 3-acyloxy-3,5-bisdehydro,
wherein said alkoxy radical contains from 1 to 10 carbon atoms inclusive and said acyloxy radical is an aliphatic acyloxy group of 1 to 6 carbon atoms inclusive,
$R_6$ is a member selected from the group consisting of hydrogen, fluorine, chlorine, bromine and methyl, $R_{21}$ is a moiety selected from the group consisting of hydrogen, hydroxy and acyloxy of 1 to 20 carbon atoms inclusive and
$X_1$ and $X_2$ are each independently selected from the group consisting of hydrogen, alkyls of 1–6 carbon atoms inclusive, phenyl and furyl, with the proviso that $R_6$ is other than halogen when $R_3$ is acyloxy 3,5-bisdehydro.

2. A compound of claim 1 corresponding to the formula:

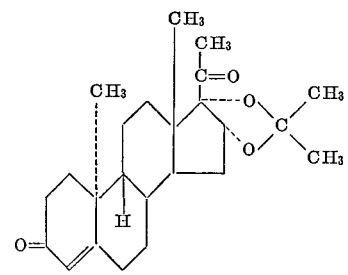

3. A compound of claim 1 corresponding to the formula:

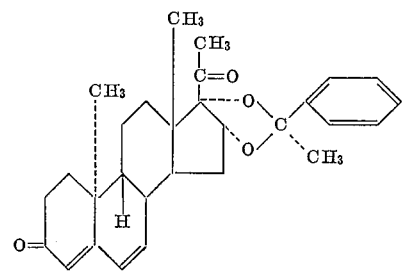

4. A compound of claim 1 corresponding to the formula:

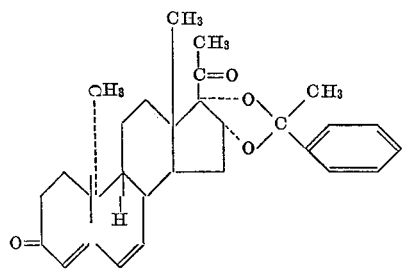

5. A compound of claim 1 corresponding to the formula:

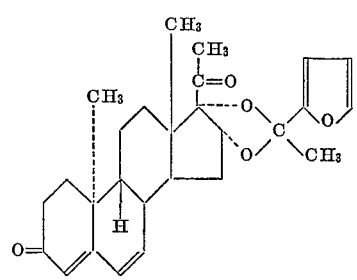

6. A compound of claim 1 corresponding to the formula:

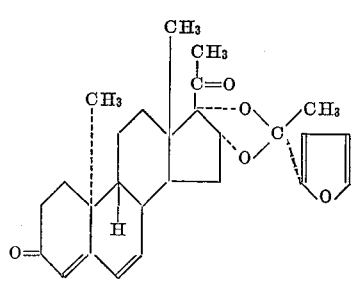

7. A compound of claim 1 corresponding to the formula:

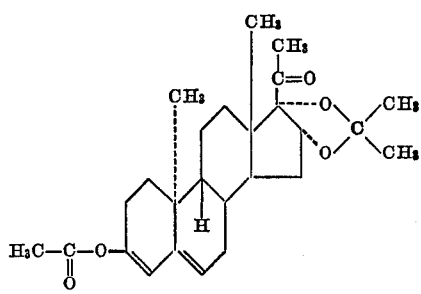

8. A compound of claim 1 corresponding to the formula:

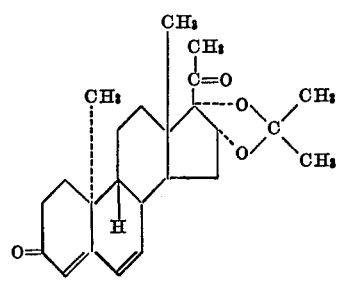

9. As a compound of claim 1, 6-chloro-16α,17α-isopropylidenedioxy-9β,10α-pregn-4-ene-3,20-dione.

10. As a compound of claim 1, 6-chloro-16α,17-isopropylidenedioxy-9 ,10α-pregna-1,4,6-triene-3,20-dione.

11. As a compound of claim 1, 6-chloro-16α,17α-isopropylidenedioxy-9β-10α-pregna-1,4,6-triene-3,20-dione.

12. As a compound of claim 1, 6-fluoro-16α,17α-isopropylidenedioxy-9β-10α-pregna-1,4-diene-3,20-dione.

13. As a compound of claim 1, 6-fluoro-16α,17α-isopropylidenedioxy-9β,10α-pregna-4-ene-3,20-dione.

14. As a compound of claim 1, 6-fluoro-16α,17α-isopropylidenedioxy-9β,10α-pregna-4,6-diene-3,20-dione.

References Cited

UNITED STATES PATENTS

| | | | |
|---|---|---|---|
| 3,134,770 | 5/1964 | Fried | 260—239.55 |
| 3,174,971 | 3/1965 | Krakower et al. | 260—239.55 |

ELBERT L. ROBERTS, Primary Examiner

PO-1050
(5/69)

UNITED STATES PATENT OFFICE
CERTIFICATE OF CORRECTION

Patent No. 3,523,943 (PHN 934B)    Dated    August 11, 1970

Inventor(s) ENGBERT HARMEN REERINK ET AL

It is certified that error appears in the above-identified patent and that said Letters Patent are hereby corrected as shown below:

Column 4, the formula in "(e)" should read:

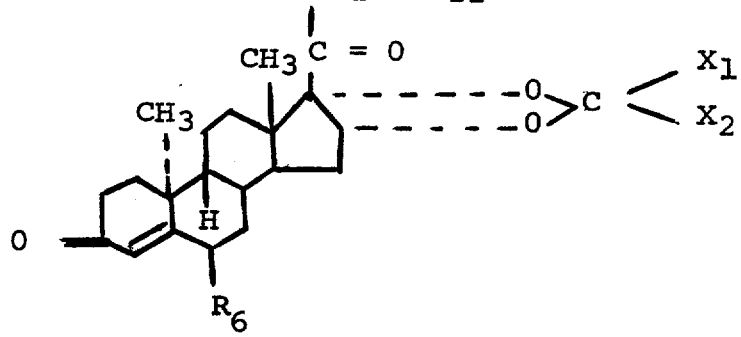

Column 5, line 22, cancel "as" (first occurance).

line 58, "means" should read -- meanings --.

Column 6, line 25, "ampullosoporum" should read

-- ampullosporum --.

line 27, "curtesii" should read -- curtisii --.

Column 7, line 71, "vacuuo" should read -- vacuo --.

Column 14, line 4, "9" should read -- 9β --.

line 3, "17" should read -- 17α --.

Signed and sealed this 18th day of July 1972.

(SEAL)
Attest:

EDWARD M. FLETCHER, JR.        ROBERT GOTTSCHALK
Attesting Officer              Commissioner of Patents